US006444148B2

(12) United States Patent
Harding

(10) Patent No.: US 6,444,148 B2
(45) Date of Patent: Sep. 3, 2002

(54) PROCESS AND MAKING MOLDS FOR THERMOFORMING A THREE-DIMENSIONAL RELIEF REPRODUCTION

(76) Inventor: Glenn T. Harding, 46 Gloxina Crescent, Agincourt, Ontario (CA), M1W 2C4

(*) Notice: Subject to any disclaimer, the term of this patent is extended or adjusted under 35 U.S.C. 154(b) by 0 days.

(21) Appl. No.: 09/809,063

(22) Filed: Mar. 16, 2001

Related U.S. Application Data

(62) Division of application No. 09/439,504, filed on Nov. 12, 1999, which is a continuation of application No. 08/646,487, filed on May 8, 1996, now abandoned.

(51) Int. Cl.[7] .......................... B29C 33/38; G06F 19/00

(52) U.S. Cl. ...................... 264/40.1; 264/219; 264/220; 264/226; 264/227

(58) Field of Search ................................ 264/40.1, 227, 264/226, 220, 219; 364/468.03, 475.02, 705.01, 710.13; 700/97, 197, 125, 127, 161

(56) References Cited

U.S. PATENT DOCUMENTS

| | | | |
|---|---|---|---|
| 36,821 | A | 10/1862 | Poitevin |
| 2,393,809 | A | 1/1946 | Potter |
| 2,673,371 | A | 3/1954 | Uhlig |
| 2,765,512 | A | 10/1956 | Nesbit |
| 3,010,152 | A | 11/1961 | Braund |
| 3,543,336 | A | 12/1970 | Feeney |
| 3,763,296 | A | 10/1973 | Burrows |
| 3,846,533 | A | 11/1974 | Carrier |
| 3,873,342 | A | 3/1975 | Ellison |
| 3,880,686 | A | 4/1975 | Robinson |
| 3,917,786 | A | 11/1975 | Weigert |
| 3,989,790 | A | 11/1976 | Bruner et al. |

(List continued on next page.)

FOREIGN PATENT DOCUMENTS

| | | |
|---|---|---|
| CA | 990506 | 6/1976 |
| CA | 2014525 | 10/1991 |
| CA | 2020206 | 12/1991 |
| DE | 29 04 194 A | 6/1979 |
| EP | 0658447 | 6/1995 |
| FR | 1493516 | 7/1967 |
| FR | 1548337 | 10/1968 |
| FR | 2678552 | 1/1993 |
| GB | 1107401 | 9/1964 |
| GB | 1161991 | 8/1969 |
| GB | 1454786 | 11/1976 |
| GB | 1572324 | 7/1980 |
| GB | 2060375 | 5/1981 |
| GB | 2281535 | 3/1995 |
| JP | 51-59515 | 5/1976 |

(List continued on next page.)

OTHER PUBLICATIONS

PCT Search Report—PCT/CA96/00176.
PCT Search Report—PCT/CA97/00313.
PCT Search Report—PCT/CA97/00464.
U.S. patent application Ser. No. 08/408,900, Harding, filed Mar. 22, 1995, abandoned.
U.S. patent application Ser. No. 08/618,401, Harding, filed Mar. 19, 1996.
U.S. patent application Ser. No. 08/678,806, Harding, filed Jul. 12, 1996.

*Primary Examiner*—Suzanne E. McDowell
(74) *Attorney, Agent, or Firm*—Riches, McKenzie & Herbert LLP

(57) ABSTRACT

Methods and apparatus useful in the development of molds are disclosed. In particular, the methods and apparatus of the present invention are useful, for example, in the context of dimensionally expanding and printing a picture image on a printable sheet for use in making a picture print thermoforming female mold of castible shrinkable material. In addition, a process for producing a male mold which replicates brush strokes of an original painting is disclosed.

17 Claims, 4 Drawing Sheets

U.S. PATENT DOCUMENTS

| | | | |
|---|---|---|---|
| 4,001,062 | A | 1/1977 | Iisaka et al. |
| 4,091,154 | A | 5/1978 | Hirai |
| 4,120,930 | A | 10/1978 | Lemelson |
| 4,163,813 | A | 8/1979 | Sheets et al. |
| 4,205,036 | A | 5/1980 | Trame |
| 4,285,744 | A | 8/1981 | Rudolf et al. |
| 4,308,224 | A | 12/1981 | Becker |
| 4,971,743 | A | 11/1990 | Lang |
| 5,102,171 | A | 4/1992 | Saetre |
| 5,116,562 | A | 5/1992 | Lang |
| 5,120,090 | A | 6/1992 | Reinl |
| 5,152,861 | A | 10/1992 | Hann |
| 5,182,063 | A | 1/1993 | Lang et al. |
| 5,201,548 | A | 4/1993 | Lang et al. |
| 5,214,022 | A | 5/1993 | Busch et al. |
| 5,286,558 | A | 2/1994 | Seo et al. |
| 5,314,370 | A | 5/1994 | Flint |
| 5,473,159 | A | 12/1995 | Krieger |
| 5,530,793 | A | 6/1996 | Watkins et al. |
| 5,589,121 | A | 12/1996 | Inagaki et al. |
| 5,667,747 | A | 9/1997 | Harding et al. |
| 5,721,041 | A | 2/1998 | Baratto |
| 5,958,470 | A | 9/1999 | Harding |

FOREIGN PATENT DOCUMENTS

| | | |
|---|---|---|
| JP | 57-126624 | 8/1982 |
| JP | 60-220729 | 11/1985 |
| JP | 05-261802 | 10/1993 |
| WO | WO 89/07530 | 8/1989 |
| WO | WO 91/09743 | 7/1991 |
| WO | WO 96/29189 | 9/1996 |

PROCESS AND MAKING MOLDS FOR THERMOFORMING A THREE-DIMENSIONAL RELIEF REPRODUCTION

RELATED APPLICATIONS

This application is a divisional application of U.S. application Ser. No. 09/439,504 filed on Nov. 12, 1999 which was a continuation of application Ser. No. 08/646,487 filed on May 8, 1996 now abandoned.

FIELD OF THE INVENTION

This invention relates to methods and apparatus useful in the development of molds used in vacuum forming in a printed thermoformable plastic sheet, an accurate three-dimensional relief reproduction of an original three-dimensional article.

BACKGROUND OF THE INVENTION

In our co-pending U.S. patent application Ser. No. 08/408,900 filed May 22, 1995 and entitled Vacuum Formed Three-Dimensional Surface Article, we have described:

1) a vacuum forming process for molding a thin sheet of thermoformable plastic to produce an accurate three-dimensional relief reproduction of an original artwork or the like;
2) an apparatus for vacuum forming a thin sheet of thermoformable plastic into an accurate three-dimensional relief reproduction of an original artwork; and
3) methods for producing male molds for use in making female molds which in turn are used in the vacuum forming of thermoformable plastic sheet to form an accurate three-dimensional relief reproduction of an original artwork.

There is a significant consumer demand for faithful inexpensive reproductions of art. In making such reproductions it has been found to be very important to reproduce the texture of the work such as the brush stroke, which may reflect light in a particular manner. As described in our co-pending U.S. application, various methods have been put forth in an attempt to re-create a three-dimensional relief of the original work. Such techniques are described in U.S. Pat. Nos. 4,285,744; 4,971,743 and French Patents 1493516 and 1548337. There are however problems associated with the techniques described in those patents and attempts to overcome those problems have been described in Canadian patent application 2,020,206; U.S. Pat. Nos. 4,001,062; 5,182,063 and 5,201,548. The activities continue in respect to overcoming various problems with the prior art processes, such as described in U.S. Pat. Nos. 4,971,743; 5,116,562 and 4,285,744. The invention defined in our co-pending application using vacuum-forming has overcome many of the problems associated with the prior art techniques and is able to provide a high quality product in a cost-effective manner. An aspect of our prior methods and apparatus involve the production of the male mold for use in making the female mold which in turn is used in the vacuum forming of the thermoformable plastic sheet. Quite unlike normal vacuum forming techniques, applicants have discovered that a very acceptable product can be made from a female mold and still retain the features of the three-dimensional surface definition and registration of that definition with the image on the plastic sheet. Various techniques are described in the afore-mentioned co-pending U.S. application for making the male mold so as to provide on its surface, a surface relief texture which is essentially the same as the original. A female mold is then made by pouring onto the surface of the male mold a suitable castible material which when hardened and released from the male mold provides a female mold having the artistic creation of the surface texture of the original work reproduced therein. The usual type of castible material has the tendency to shrink as it hardens in producing the final female mold. In particular, if the castible material is of an epoxy resin there is considerable shrinking during the curing process so that the female mold in its cured form is smaller than the original work from which the male mold was made.

It is an object of an aspect of this invention to overcome the problems associated with the castible shrinkable material from which the female mold is made and which greatly enhances the flexibility in making of the female mold and greatly accommodates various changes that one would like to make in producing multiples of the male mold from the which the female molds would be made.

SUMMARY OF THE INVENTION

In accordance with an aspect of the invention, a programmable system for dimensionally expanding and printing a picture image on a printable sheet for use in making a picture print thermoforming female mold of castible shrinkable material, comprises:

i) a programmable computer having a memory in which the picture image is digitally stored;
ii) a computer driven printer having a moveable printing head for printing the picture image on a sheet as the printing head moves relative to a sheet;
iii) the computer having a program for dimensionally expanding a picture image stored in the memory, the program expanding a stored picture image from:
    a) an original dimensional size having a length and a width identical to a final picture print size on a thermoformable plastic sheet to be molded in such female mold, to:
    b) an expanded dimensional size having an expanded length and width equal to an extent to which such female mold of such castible shrinkable material shrinks from its original poured state to its hardened state,
iv) the computer being actuated to drive the printer to print such expanded image onto a sheet.

In accordance with another aspect of the invention, a method for dimensionally expanding and printing a picture image on a printable sheet and making a picture print thermoforming female mold of castible shrinkable material. The method comprises:

i) digitally storing the picture image in a computer memory;
ii) printing the picture image on the sheet by use of a computer driven printer having a moveable printing head which prints the image as the printing head is moved relative to the sheet;
iii) dimensionally expanding the picture image stored in the memory from:
    a) an original dimensional size having a length and a width identical to a final picture print size on a thermoformable plastic sheet to be molded in the female mold, to:
    b) an expanded dimensional size having an expanded length and width equal to an extent to which the female mold of such castible shrinkable material shrinks from its original poured state to its hardened state, iv) printing the expanded picture image onto the sheet;

v) brushing onto the printed expanded image a hardenable compound to replicate on the printed image, brush strokes of an original picture image to form a male mold;

vi) making a female mold by pouring the castible shrinkable material on the male mold, curing the castible shrinkable material whereby the material shrinks a predetermined extent in length and width to take on the original dimensional size of the length and width for the final picture print size.

In accordance with another aspect of the invention, a process is provided for producing a male mold which replicates three-dimensional surface relief of an original. The process comprises:

i) printing a picture image of the painting on a printable sheet;

ii) brushing onto the printed picture image a hardenable compound to replicate on the image the three-dimensional aspects of the original;

iii) allowing the compound to harden to produce thereby the male mold.

BRIEF DESCRIPTION OF THE DRAWINGS

Preferred embodiments of the invention are described with respect to the drawings wherein.

DETAILED DESCRIPTION OF THE PREFERRED EMBODIMENTS

Figure 1:
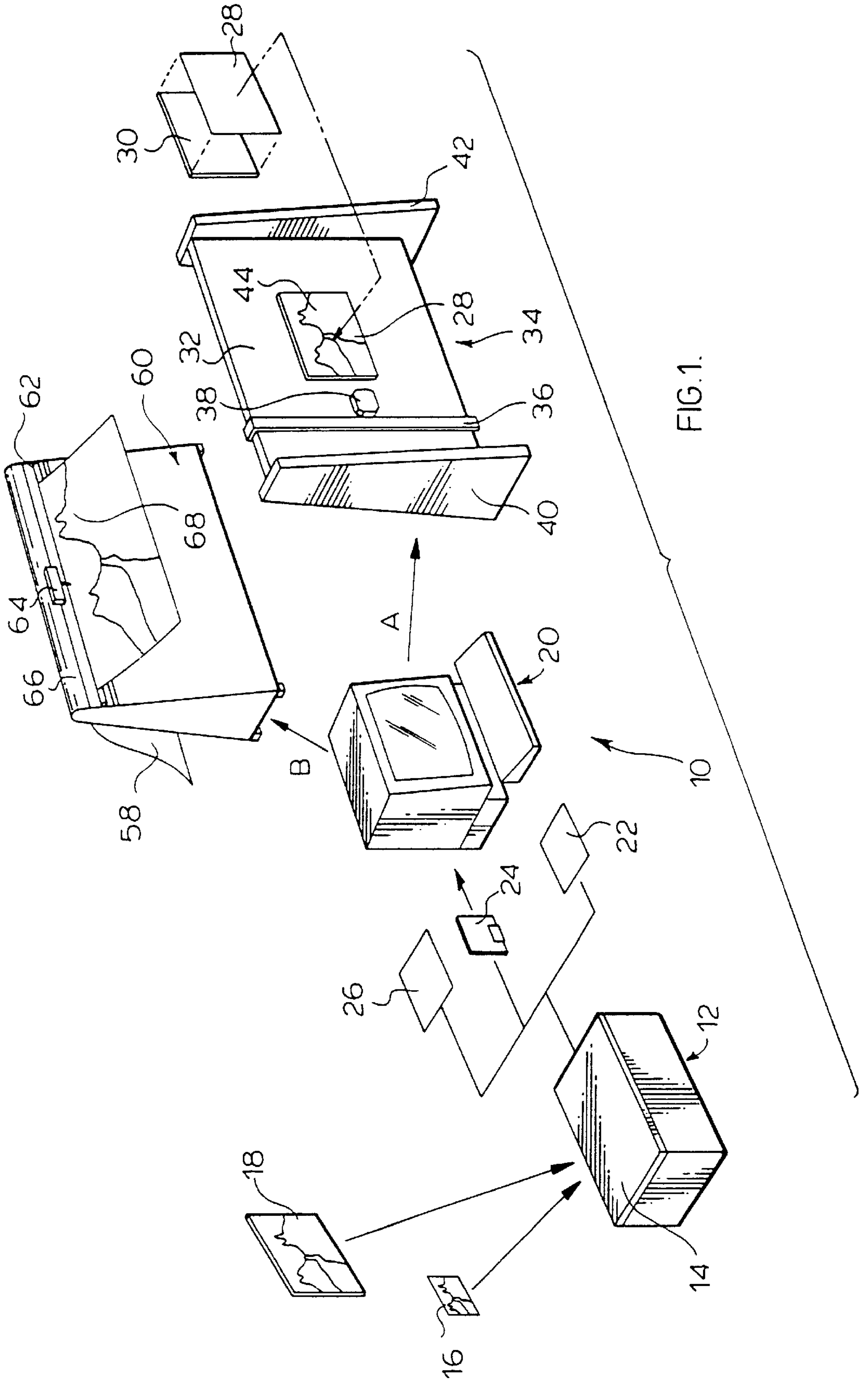
FIG. 1 is a perspective of the programmable system for expanding and printing a picture image on a printable sheet having a canvas texture.

As described in applicant's co-pending U.S. application, the male mold was preferably formed by projecting an image onto suitable substrate. A cakeable material commonly referred to as artist putty or artist caking commonly made from acrylic polymer is applied to the substrate, in a manner to resemble the brushstrokes of the original piece of art. This technique has proven quite useful in making the male mold because one could apply the artist putty to the substrate and then stand back and see the image overlaying the applied material and determine if the brushstrokes were in the right place. Hence, the male mold was made in an expeditious, fairly accurate manner, however, when it came to casting the female mold, particularly when made of castible, shrinkable material, the female mold was then dimensionally smaller than the male mold and hence when the print was made it had to be scaled down slightly from a standard print size to accommodate the shrinkage in the mold.

The invention sets out to solve this problem and has surprisingly provided some alternatives in how the male mold may be made to provide ultimately a female mold of a shrunk size corresponding to the desired print size on the plastic sheet to be thermoformed. The invention provides a programmable system which has as its objective, to expand the dimensional size of the picture print and print it on a suitable substrate to in turn provide a slightly enlarged printed picture image. The artist then applies the artist putty directly onto the printed image to resemble the brushstrokes of the original work. The system for expanding the dimensional size of the picture image is described with respect to FIG. 1. The system 10 comprises an image scanner 12 having an image scanning surface 14. The picture to be scanned may be of various sizes such as represented by photograph 16 or print 18. The picture is laid on the scanning surface 14 and the scanner 12 is actuated by a computer 20 which causes the scanner to convert the image on the photograph 16 or print 18 into a digital image. The digital image may then be stored on various types of mediums such as a compact disk 22, a magnetic storage disk 24 or other forms of memory represented by 26 such as magnetic tape. The digital information may be transferred directly into the computer 20 or via one of the memory mediums be inserted into the computer 20 for reading by the computer. This standard technique is often done in lithography. A transparency or a print or an illustration is scanned on a scanning device such as a Hall scanner or Scitex scanner. The scanner color separates the picture into the four basic colors of cyan, magenta, yellow and black. The electronic files can be manipulated to change colors, enhance sharpness, retouch and the like. The electronic files can also be manipulated to produce the subject in proper size and position either in singles or in multiples on a layout for a desired format of the printed job. The four color film produced is used to produce the printing plates for the litho press.

The digitally stored image can be printed on a suitable sheet preferably canvas textured sheet, by choosing a printer in the direction of arrow A or a feed-type printer in the direction of arrow B. Should the operator choose to print the digital image from the source 16 or 18 using the printer of system A, a canvas sheet or a sheet having a canvas texture 28 is preferably mounted on a hard backing 30, although it is understood that sheet 28 may be mounted directly to the printer support face 32. Either way the canvas textured substrate is readied for printing by the computer driven printer 34. It is understood a sheet or length of material having a canvas texture may in addition to canvas be any type of substrate which has a canvas texture formed therein such as a sheet of wood byproduct or plastic having a canvas texture formed therein or molded thereon. The printer 34 has a transport beam 36 carrying a printing head 38. The transport beam 36 traverses the entire length of the support surface 32 from side 40 through to side 42. The printer head 38 can move anywhere along the length of the transport beam 36. The printing head 38 may be equipped with suitable colour printing devices which are capable of printing 2, 4 or 6 colour separations. A preferred type of printer for this embodiment is sold by Alpha Merics Corporation under the trade-mark SPECTRUM.

Computer 20 then drives the printer 34 to print the image 44 on the surface of the canvas texture substrate 28. The computer 20 is provided with a program for dimensionally expanding a digitally stored image in the memory of the computer 20. The purpose of the program is to expand the stored picture image from an original dimensional size having a length and a width identical to a final picture print size, such as, for example, the original dimensional size as demonstrated in FIG. 6. The original print size 46 has a width dimensional 48 and a length dimension 50. The computer's program then expands that image from the original size of the image 46 to the expanded size 52 having an enlarged width 54 and enlarged length 56. The extent to which the image 46 is expanded is, in this particular embodiment, determined by the extent to which the castible shrinkable material contracts during the curing process, as will be described with respect to FIGS. 4 and 5. For example, with a preferred castible material being an epoxy resin having up to 80% by weight of aluminum as a heat conductive filler, the resin shrinks one sixteenth of an inch for every 12 lineal inches of poured resin. Hence, for a print having a length of 12 inches and a height of 6 inches the expanded dimension for the image, that is image 52, would be 12 and one sixteenth inches×6 and one thirty-seconds of an inch to take into consideration that the castible shrinkable material will shrink to a dimension of 12 inches by 6 inches during the curing process. A preferred epoxy resin having these shrinking characteristics may be obtained from Chemque of Quebec and sold under the trade-mark CHEMCAST 402.

The image printed by printer 34 and identified as 44 in FIG. 1 has been expanded from its original size, which may be demonstrated by print 18 so as to compensate for shrinkage of the female mold such that when it is cured, the female mold will be essentially the same size as the original picture image 18. The computer driven printer can print directly on the canvas substrate which is preferably an artist canvas 28 where both the printing head 38 and the transport beam 36 moves in creating the desired image 44 on the sheet 28.

Alternatively, the computer operator may select printer B which is capable of either feeding individual sheets of canvas textured substrate 58 or a roll of substrate through a printer 60 or the printer 60 may have a sheet feed mechanism 62 which may consist of a form of tractor drive for advancing the sheet 58 through the printer. Alternatively opposing feed rollers are provided which accurately advance the sheet through the printer or may be other suitable feed mechanisms which can advance the sheet 10 through the printer in the necessary increments. The printer 60 includes a moveable printing head 64 which travels along the support beam 66 to create the image 68 on the substrate 58. It is also understood that the substrate 58 instead of being individual sheets fed through the printer can also be a continuous length of canvas removed from a spool of canvas and correspondingly rolled up after the canvas is printed. As with printer 34, printer 60 is capable of printing not only on sheets that have a canvas texture but as well actual artist canvas or the like. The image can be printed in four colour separation to give a fairly accurate reproduction of the colours of the original image.

Again, the computer 20, in accordance with its program, dimensionally expands the image 68 printed on the substrate 58. The extent of the expansion again depends on the size of the final image. For example, with the printing system of either 34 or 60, it is understood that images can be printed which may have dimensions up to 6 ft.×8 ft. Although images of this size would make thermoforming a single sheet very difficult, there would not be a limitation on the production of the expanded images for purposes of making such male molds. It is also understood that the computer 20 may be programmed to generate multiple images on the same substrate whereby a female mold is made having separate multiple molds for the same image. The computer is programmed to correspondingly enlarge each individual image so as to fill the substrate with for example, four images, all of which have been slightly enlarged to compensate for the shrinkage of the mold in respect of each of these smaller multiple images.

The computer 20 is then programmed to expand the image to the desired extent in compensating for shrinkage of the female mold material. It is understood that a variety of scanner devices 12 may be employed which, in some form of another, convert the image of the photograph, painting or the like, into digital format. It is also understood that the program on the computer readily adapts to changing situations. As long as the extent of shrinkage of the female mold material is known, the image or images can be readily expanded to compensate for shrinkage of the female mold relative to the male mold. In printing such enlarged images, as described with respect to printers 34 and 60, it is understood that portions of the entire print may be printed or the printer is programmed to print all of the image for each section of the image as it advances along the substrate. For example, with printer 60, the advance mechanism 62 advances the canvas textured sheer through the printer to present a portion of the canvas texture sheet on which a corresponding portion of an image is printed thereon by the printing head as the sheet is advanced in increments through the printing system.

Figure 2:
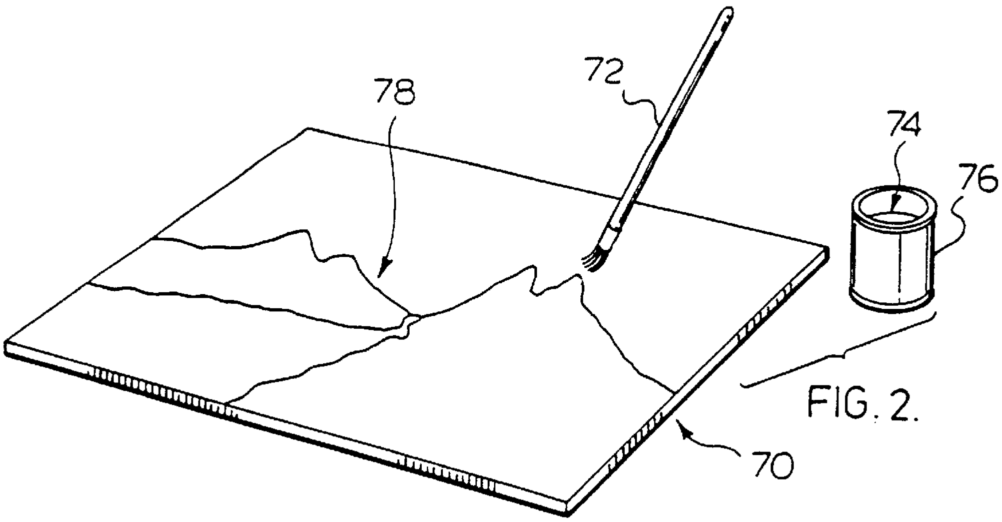
FIG. 2 is perspective view of an artist reproducing the brushstrokes on the printed image of FIG. 1.
Figure 3:
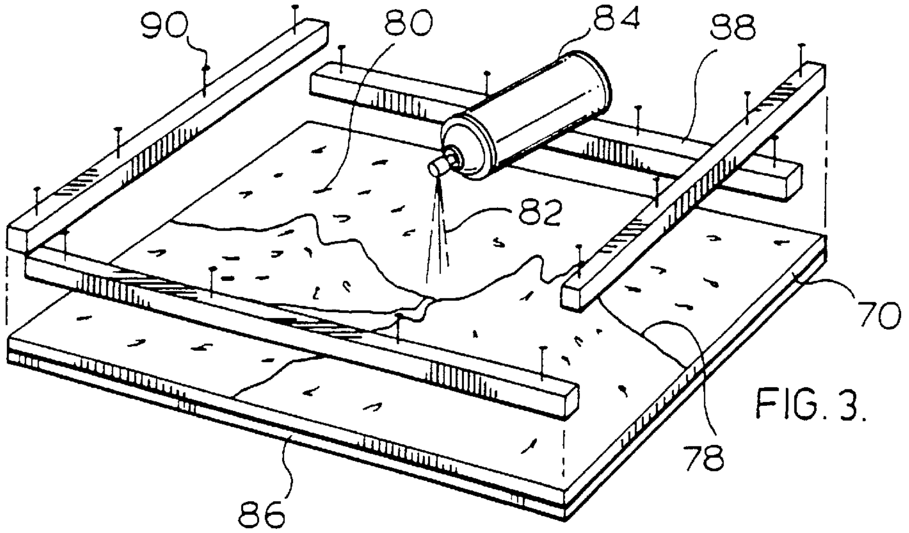
FIG. 3 is a perspective view in preparing the male mold for receiving a castible material in producing the female mold.

With the enlarged printed canvas sheet 70 in hand. an artist, by way of a brush 72, spatula or the like, may apply to the canvas sheet 70, as shown in FIG. 2, the artist putty compound 74 stored in the usual container 76. The artist applies to the image 78 the putty compound 74 to reproduce on the image 78 the brushstrokes and other shapes that the artist had employed in painting the original. The artist in applying the putty material to the enlarged image does so in proportion to the enlargement which is not difficult in view of the fact that the image is only slightly enlarged relative to the original 18. As shown in FIG. 3, the male mold has had applied thereto a substantial coating of the putty material, generally indicated at 80. In most situations the putty material completely covers the image 78 so that all that is visible on the canvas sheet 70 is the hardened putty which in essence constitutes the male mold.

The male mold is then sprayed as shown in FIG. 3 with a suitable mold release material. The spray 82 may be of a silicone spray from the usual spray can dispenser device 84. The canvas 70 may be mounted on a suitable solid support 86 and then have fastened thereto perimeter frame members 88, which are preferably secured by screws 90 to the solid support 86. With the sides 88 in place, a recess is defined equivalent to the thickness 92 of the sides 88.

Figure 4:
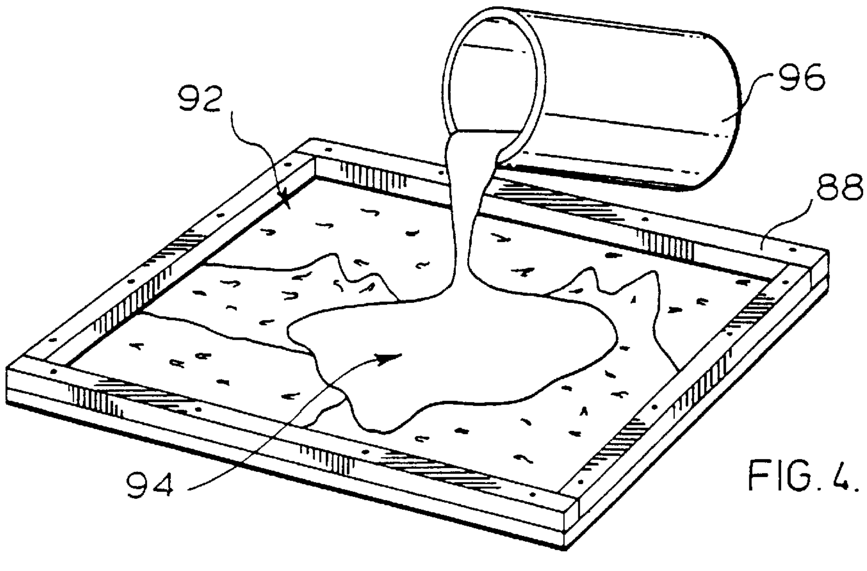
FIG. 4 is a perspective view of the male mold receiving the castible material to make the female mold.
Figure 5:
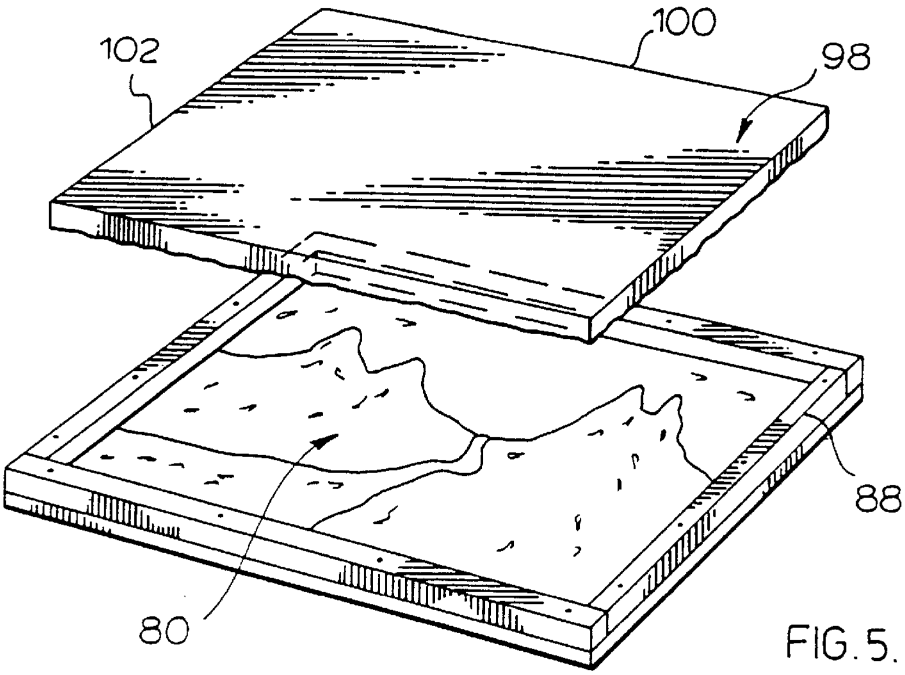
FIG. 5 shows the female mold separated from the male mold.
Figure 6:
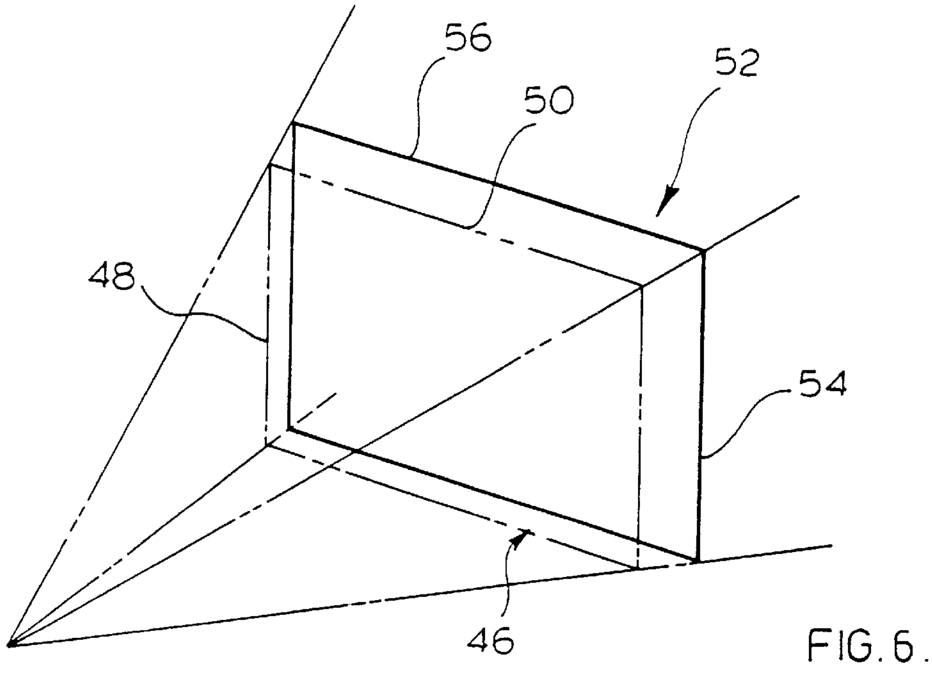
FIG. 6 shows the extent to which the female mold shrinks relative to the male mold.
Figure 7:
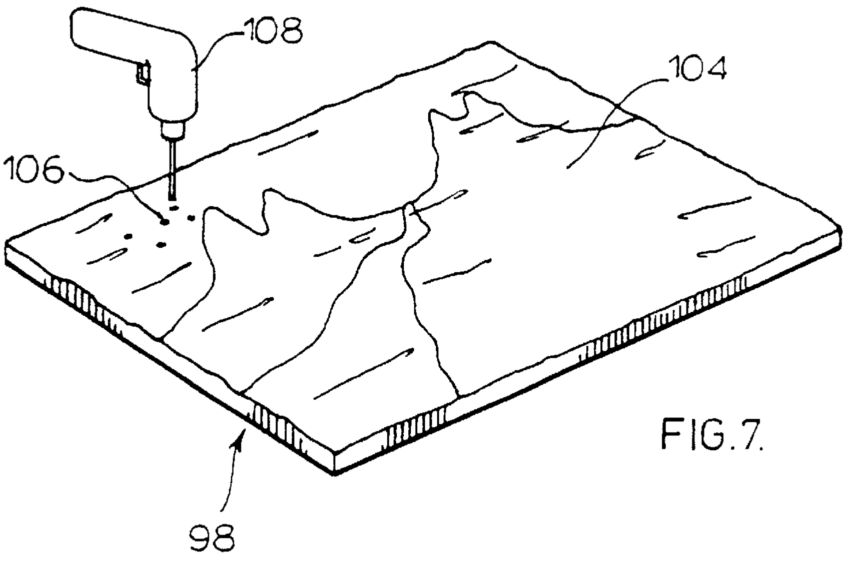
FIG. 7 shows the preparation of the female mold for use in vacuum forming the printed thermoplastic sheet.

The recess is then filled by the castible, shrinkable material 94 which is poured ideally from a suitable container 96 in the manner shown in FIG. 4. As already described, in accordance with a preferred embodiment, the curable material 94 may be an epoxy resin. The epoxy resin simply flows over the surface of the canvas sheet 70 having the relief provided thereon with the caked putty material 80. The epoxy resin 94 is cured in accordance with the manufacturers suggestions. During that curing process, the material shrinks, as already noted in the range of $\frac{1}{16}$ of an inch for 12 inches of lineal length. After the resin is fully cured, as shown in FIG. 5, the female mold, as formed by the cured resin 98 is separated from the male mold 80 having the sides 88 retained thereon. The backside of the female mold is shown in 95 where the mold has shrunk in its length, dimension 100 and its width dimension 102 to the extent as expected where the length and width of the surface relief for the image would be equivalent to the original length and width of the image such as demonstrated in FIG. 6 by image 46 having a width 48 and length 50. It is understood that the female mold may be a perimeter portion outside of the image relief formed therein. Hence the shrunken mold, although its exterior dimensions may be larger than the desired print size, has its formed relief of the same size as the desired standard print size.

Figure 8:
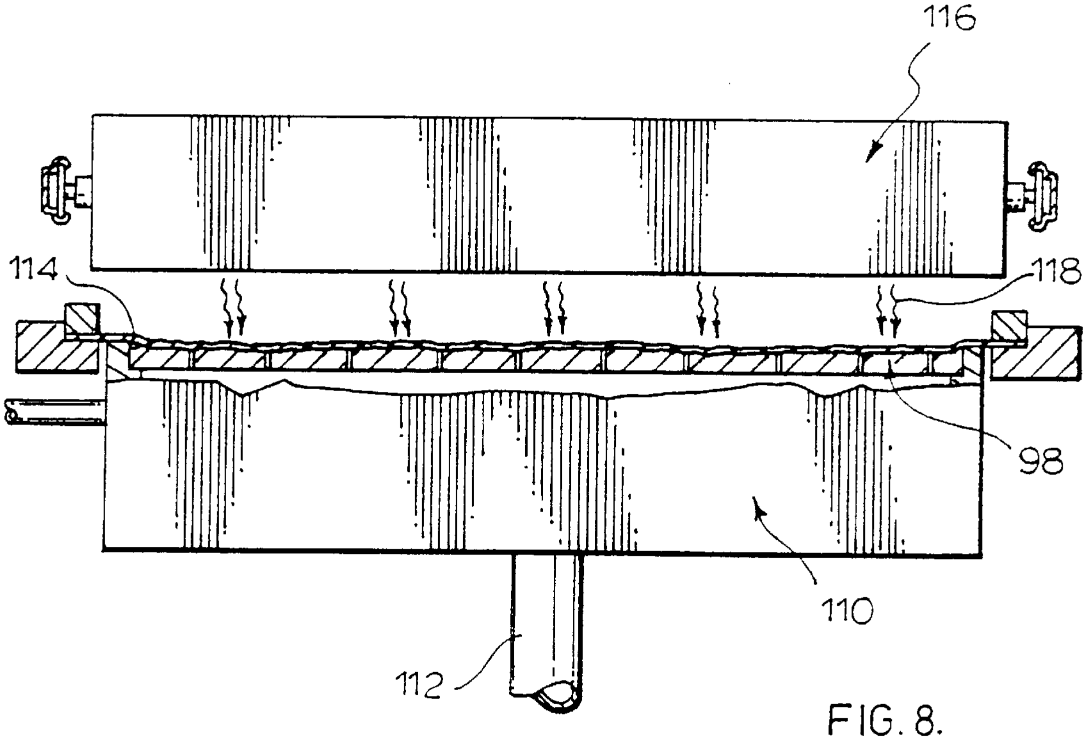
FIG. 8 is a side elevation with a portion thereof removed showing the vacuum forming of the printed sheet in making a reproduction of the original.

As is the usual procedure, the female mold 98 is turned over to expose the recess and detents in the surface 104 of the female mold which is a mirror image and corresponds to the surface generated by the male mold 80. In the usual manner, a plurality of vacuum holes 106 are drilled in the female mold 98 by use of appropriate drill 108. The reliefs, detents, grooves, undercuts and the like in the surface of the female mold 104 is then in register with the original size of the printed image so as to provide a relief in the printed image in exact register with the desired brushstrokes for the final image itself. Such vacuum forming of the relief in the sheet is shown in FIG. 8. The female mold 98 is provided in a vacuum box 110 where vacuum is withdrawn from the box through vacuum line 112. The thermoformable plastic sheet 114 is positioned slightly above the mold 98 and heated by the retractable heater 116 by way of the radiant heat indicated by arrows 118. As described in the aforementioned U.S. patent application, the sheet is heated in accordance with a prescribed technique, vacuum applied, the sheet cooled, the vacuum released and the sheet removed wherein the relief is vacuum formed into the plastic sheet in register with the image.

Hence, by use of the programmable system, a convenient, accurate arrangement is provided for making the male mold from which the female mold is ultimately made while taking into consideration shrinkage of the castible material for making the female mold. The programmable system allows an operator to vary the size of the image at will, to format several of the same images in a single canvas substrate for making the male mold. The system can be programmed to immediately adjust the enlargement of the image depending upon the selected finish size for the image. By scanning the image and storing it electronically, the same information may be transposed over to the printer to print the image of the exact enlarged size as the required enlarged male mold.

Although preferred embodiments of the invention are described herein in detail, it will be understood by those skilled in the art that variations may be made thereto without departing from the spirit of the invention or the scope of the appended claims.

What is claimed is:

1. A method for dimensionally expanding and printing a picture image on a printable sheet and making a picture print thermoforming female mold of castible shrinkable material, said method comprising:

i) digitally storing said picture image in a computer memory;

ii) dimensionally expanding said picture image stored in said memory from:

a) an original dimensional size having a length and a width identical to a final picture print size on a thermoformable plastic sheet to be molded in said female mold of castable shrinkable material, to:

b) an expanded dimensional size having an expanded length and width wherein said expanded dimensional size is determined in direct relationship to the amount of shrinkage of said castible shrinkable material forming said female mold; and iii) printing said expanded picture image onto said sheet by use of computer driven printer having a moveable printing head which prints said image as said printing head is moved relative to said sheet;

iv) brushing onto said printed expanded image a hardenable compound to replicate on said printed image, brush strokes of an original picture image to form said male mold;

v) making said female mold by pouring said castible shrinkable material on said male mold, curing said castible shrinkable material whereby said material shrinks a predetermined extent in length and width to take on said original dimensional size of said length and width for said final picture print size.

2. A method of claim 1 further comprising converting said picture image into a digital format for storage in said computer memory.

3. A method of claim 1 wherein said castible shrinkable material is an epoxy resin, said step of curing, shrinking said resin a consistent pre-determined extent in its length and width dimensions.

4. A method of claim 3 wherein curing of said resin to a hardened state shrinks said resin about one sixteenth of an inch for every twelve inches of poured resin in its length and width dimensions.

5. A method of claim 4 wherein said brush strokes are in proportion to the expanded dimensional size of said picture image.

6. A method of claim 3 wherein said brush strokes are in proportion to the expanded dimensional size of said picture image.

7. A method of claim 1 wherein said printable sheet is an artist's canvas.

8. A method of claim 7 wherein said canvas is mounted on a solid substrate to provide thereby a dimensionally stable mounting of said canvas as said printing head prints said expanded image on said canvas.

9. A method of claim 7 wherein said canvas is advanced to expose a portion of said canvas on which a corresponding portion of said image is printed.

10. A method of claim 7 wherein said brush strokes are in proportion to the expanded dimensional size of said picture image.

11. A method of claim 1 wherein said brush strokes are in proportion to the expanded dimensional size of said picture image.

12. A process for producing a male mold for use in formation of a cast picture print forming female mold which is to be formed from a castable shrinkable material and which replicates brush strokes of an original painting, said process comprising:

i) printing a picture image of said painting on a printable sheet, said picture image having an expanded dimensional size which is greater than a dimension of said original painting and wherein said dimensional size is further determined in direct relationship to the anticipated amount of shrinkage of the material used in casting said female mold;

ii) brushing onto said printed picture image a hardenable compound to replicate on said image brush strokes of said original painting;

iii) allowing said compound to harden to produce thereby said male mold.

13. A process of claim 12 wherein said hardenable compound is an artist putty.

14. A process of claim 12 wherein said brush strokes of hardened compound are built up to an extent which enhances brush stroke height in making said male mold.

15. A process of claim 12 wherein said female mold is a picture print thermoforming female mold.

16. A process of claim 12 wherein said brush strokes are in proportion to the expanded dimensional size of said picture image.

17. A process of claim 14 wherein said brush strokes are in proportion to the expanded dimensional size of said picture image.

* * * * *